United States Patent [19]

Shoda

[11] 4,007,490
[45] Feb. 8, 1977

[54] TIME LAPSE VIDEO TAPE RECORDER
[75] Inventor: Hiroshi Shoda, Tokyo, Japan
[73] Assignee: Sony Corporation, Tokyo, Japan
[22] Filed: July 30, 1975
[21] Appl. No.: 600,212
[30] Foreign Application Priority Data
   Aug. 7, 1974   Japan .................. 49-89899
[52] U.S. Cl. ....................... 360/11; 360/33; 360/35
[51] Int. Cl.² ................................. H04N 5/78
[58] Field of Search ............... 360/11, 33, 35, 38; 178/DIG. 38

[56] References Cited
UNITED STATES PATENTS 3,573,356   4/1971   Toce .................. 360/11 X
3,908,080   9/1975   Broadbent .................. 360/11 X

*Primary Examiner*—Harold M. Pitts
*Attorney, Agent, or Firm*—Lewis H. Eslinger; Alvin Sinderbrand

[57] ABSTRACT

A time lapse video tape recorder has rotary magnetic transducers connected to receive video signals during selected, spaced intervals and record them on a magnetic medium. In succeeding intervals switching means connects the transducers to a playback and alarm system to produce a warning if the signal as reproduced is defective in a predetermined manner, thereby indicating possible malfunctioning of the recording apparatus.

7 Claims, 2 Drawing Figures

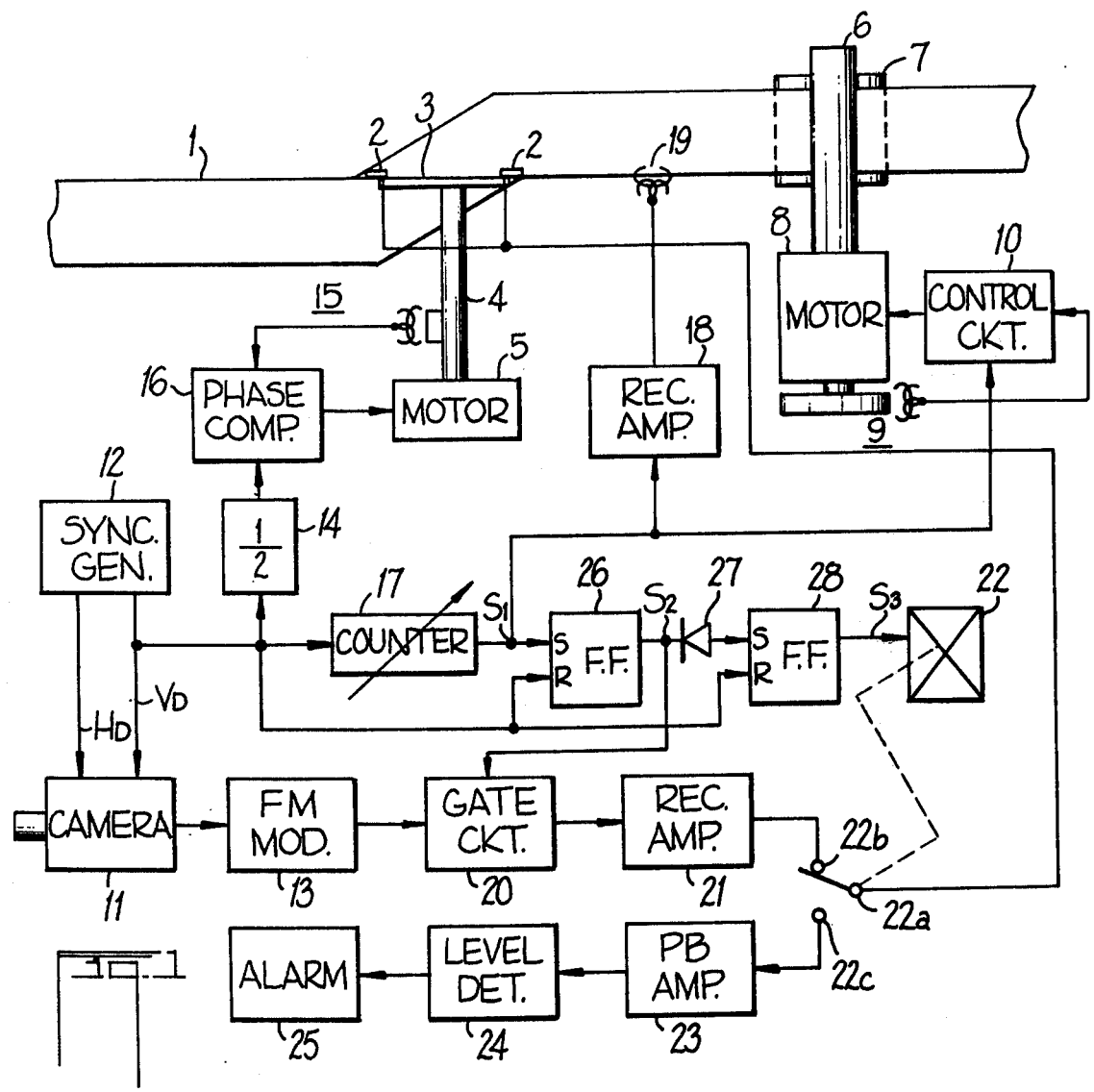
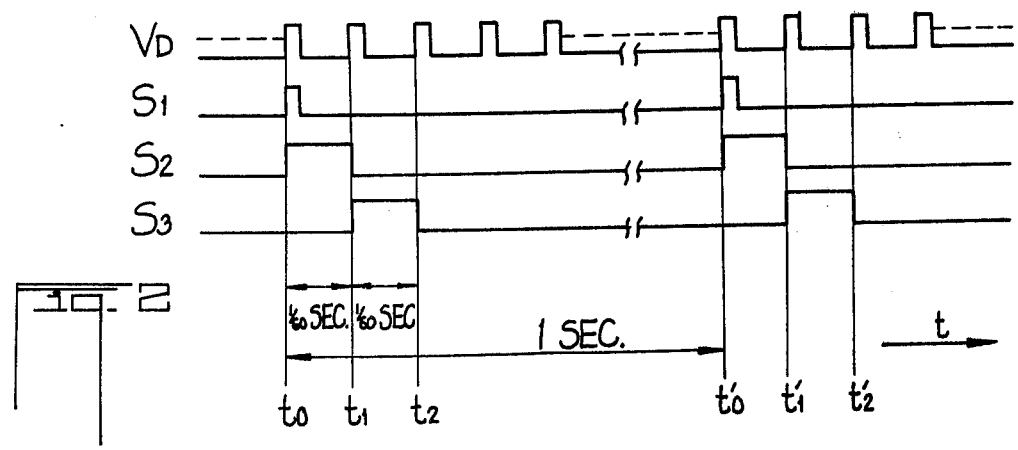

TIME LAPSE VIDEO TAPE RECORDER

BACKGROUND OF THE INVENTION

1. Field of the Invention

This invention relates to a video tape recorder having rotary magnetic heads, and particularly to the type of recorder known as a time lapse video tape recorder that may be energized by a continuous series of video signals but is controlled to record, normally, only selected, time-spaced video signals. The invention is especially directed to a system that provides for playback of the recorded signals, usually in the next equal time interval after such recording takes place, to determine whether or not the recording apparatus is operating properly.

2. The Prior Art

The purpose of a time lapse video tape recorder (hereinafter referred to as a time lapse VTR) is to record only the relatively small number of signals corresponding to video images, even though such signals are applied to the apparatus on a continuous basis. Time lapse VTRs are especially useful for surveillance of banks, department stores, and other places in which a high percentage of the television images that might be recorded is of no use. In order to eliminate unnecessary use of video tape in such VTRs, the continuous video signal is gated so that only an occasional frame or field interval is recorded. The tape can be run at a lower speed corresponding to the intermittency of the signal to be recorded. For example, if only 1/60 of the fields are to be recorded, the tape may be run at 1/60 of the normal speed, without causing the tracks on which the signals are recorded to overlap each other so as to obliterate the recorded signals. However, in such apparatus the rotary magnetic head usually runs at the same speed as in a normal tape recorder and thus each incremental area of the tape is subjected to a high rate of wear due to the repetitive, frictional, scanning of the tape by the transducers. As a result, the magnetic coating material is likely to wear off, thereby making it impossible to produce a proper recording, and the air gaps in the magnetic transducers are likely to be blocked, thereby further interfering with the ability of the apparatus to record images properly or, indeed, to record them at all. Furthermore, such apparatus is likely to be operated continuously for a long period of time, for example 24 hours or even much longer, without being checked to see that the images are satisfactory. In any of these cases, when the rare occasion makes it absolutely essential to produce a properly recorded image, the apparatus may be unable to do so.

SUMMARY OF THE INVENTION

It is one of the objects of the present invention to provide a time lapse VTR in which the recorder information is monitored by being played back on a regular basis, usually immediately after each recording.

A further object of the invention is to provide automatic means for checking at least certain essential qualities of the reproduced signal so as to actuate an alarm if the reproduced signal is defective.

In a time lapse VTR according to the present invention, certain intervals of a continuously available signal are allowed to pass through a gate and to energize magnetic transducer means so as to be recorded on a magnetic recording medium. Typically the recorded interval will be a television field or frame. The apparatus is further provided with switching means controlled in a manner synchronous with the gate circuit to utilize the transducer means to play back the recorded signal, preferably in the next field or frame interval.

If the apparatus includes two magnetic transducers spaced 180° apart in a rotary magnetic head, one of the transducers may be used to record selected field intervals and the other to play back the same intervals. Since the tape moves relatively slowly, the second transducer traces out substantially the same track that was recorded by the first transducer. If the two fields making complete frame are to be recorded, it may be preferable, due to the slow linear movement of the tape, to offset the two diametrically opposite tranducers so that they will not trace out the same tracks but will trace out adjacent tracks. Even in such circumstances, the slow movement of the film means that there will be sufficient overlap of the traced out tracks so that if the transducers are switched from the recording condition to the playback condition immediately after the recording interval has been completed, the played back signal will still give sufficient indication of the quality of the recording, particularly if that indication of quality is primarily based on the amplitude of the recording.

In another embodiment of the invention an ordinary video tape recorder can be used in which the tape moves at normal speed but the only signals that are recorded are those that correspond to a small faction of the continuously available television image signals. Since only occasional images are recorded, it is not necessary that the tape be moved continuously. Instead, it can also be moved intermittently, being brought up to speed just in time to receive the signal to be recorded, and then being stopped as soon as possible after the recording and evaluation playback has taken place.

BRIEF DESCRIPTION OF THE DRAWINGS

FIG. 1 is a block diagram of time lapse video magnetic recording apparatus according to the present invention.

FIG. 2 is a graphical representation of signals that occur in the operation of the apparatus in FIG. 1.

DETAILED DESCRIPTION OF THE INVENTION

In the apparatus in FIG. 1 video magnetic recording tape 1 is scanned by a pair of magnetic transducers 2 located at opposite ends of an arm 3 attached to a rotary shaft 4 driven by a motor 5 at a predetermined speed. Typically, the arm 3 is rotated at a speed of 30 cycles per second, or 1800 rpm. The magnetic tape is guided in a helical path around the rotary head in the usual manner and is pulled along by a capstan 6 and pinch roller 7. The capstan is driven by a motor 8, the rotational speed of which is detected by a detector 9 and used to generate a signal applied to a control circuit 10 that controls the exact speed of the motor 8.

Television signals are generated in a television camera 11 to which horizontal synchronizing signals $H_D$ and vertical synchronizing signals $V_D$ are applied from a synchronizing signal generator 12. The video signal produced in the camera 11 is connected to a frequency modulator 13 to modulate the frequency of a carrier therein.

The vertical synchronizing signals from the generator 12 are also connected to a frequency divider 14 that divides them by 2 to produce an output signal, normally a pulse signal, that has a repetition rate of 30 cycles per second. A pulse generator 15 includes a magnet attached to the rotating shaft 4 and a pickup head that derives electric pulses due to the field of the rotating magnet on the shaft. These pulses occur, under synchronous conditions, at the rate of 30 per second and are applied to a phase comparator 16 to be compared with the 30 cycle signal from the frequency divider 14. The output of the phase comparator 16 is connected back to the motor 5 so that both its rotational speed and its phase position are controlled.

The vertical synchronizing signals from the sync generator 12 are also applied to a counter 17 that may be set to count any desired number. For example the counter 17 may be set to produce one output pulse for each 60 input pulses so that the output signal has a repetition rate of 1 cycle per second. The output of the counter 17 is connected to a recording amplifier 18 which, in turn, is connected to a stationary recording head 19 that records control pulses along one edge of the tape. The location of each of the latter pulses has a certain relationship to the location of each track on the tape on which one of the transducers 2 has recorded a signal. The output of the counter 17 is also connected to the control circuit 10 to be compared with the signal from the rotation detector 9 to control the rotational speed of the motor 8.

The frequency modulated video signal from the frequency modulator 13 is connected to a gate circuit 20. The output of the gate circuit 20 is connected through a recording amplifier 21 to one of the terminals 22b of switching means 22 here illustrated as a relay having a movable arm 22a and two fixed terminals 22b and 22c. The arm 22a is connected to the transducers 2 to supply the signal to be recorded on the tape 1.

The terminal 22c is connected to a playback amplifier 23 which, in turn, supplies an output signal to a level detector 24. The level detector detects the amplitude of the output signal of the playback amplifier 23 and supplies a signal to an alarm 25 that may be an audible or visual alarm or both. The alarm 25 may also actuate means to disable the apparatus to prevent any further attempt to use it until it is returned to proper operating conditions.

The output of the counter 17 is connected to the SET terminal of the flip-flop 26, and the output of the flip-flop 26 is connected through a diode 27 to the SET terminal of a second flip-flop 28. The video synchronizing signal $V_D$ from the sync generator 12 is connected to the RESET terminals of both of the flip-flops 26 and 28. The output of the flip-flop 26 is also applied to a gating signal input terminal of the gate circuit 20. The output of the flip-flop 28 is applied to the switching means 22 to control the operation of the movable arm 22a.

The operation of the apparatus in FIG. 1 will be described with reference to the signals graphically illustrated in FIG. 2. The vertical synchronizing signals $V_D$ are illustrated in the top line of signals in FIG. 2 as positive pulses that have a fixed repetition rate. The counter 17 counts a selected number of vertical synchronizing pulses $V_D$, for example 60 pulses, and produces an output signal $S_1$ that may be, for example, a positive pulse at the time $t_0$. The signal $S_1$ sets the flip-flop 26 to initiate a gating signal $S_2$ to be applied to the gate circuit 20. The end of the gate signal $S_2$ occurs when the flip-flop 26 is reset. In the illustrated embodiment, this occurs at the next succeeding vertical sync pulse $V_D$ so that the gate signal lasts from the time $t_0$ to the time $t_1$.

The flip-flop 28 is set by the trailing edge of the signal $S_2$ and it also lasts until the flip-flop 28 is reset. As in the case of the flip-flop 26, the flip-flop 28 is reset by the next vertical sync pulse at the time $t_2$. Thereafter, the flip-flops 26 and 28 remain reset until the counter 17 produces another pulse $S_1$ at the time $t'_0$. If the counter 17 counts down by 60:1, the pulses $S_1$ recur at the rate of once each second. The second pulse $S_1$ at the time $t'_0$ initiates another sequence, including the pulse $S_2$ between the times $t'_0$ and $t'_1$ and the pulse $S_3$ between the times $t'_1$ and $t'_2$.

The switching means 22 has a normal condition in which the movable arm 22a connects with the terminal 22b to receive signals from the recording amplifier 21 each time such signals are allowed to pass through the gate circuit 20. The signal $S_3$ applied to the switching means 22 causes the movable arm 22a to switch over and engage the terminal 22c. This takes place during the vertical field interval and immediately following the interval in which the last video image signal was recorded on the tape 1. As a result, the transducer 2 diametrically opposite the one that recorded the last signal will play back that recording. Since the tape is moving very slowly, the areas traced out by the two diametrically opposite transducers 2 overlap to a great extent. The signal picked up by the second transducer 2 is then fed back through the movable arm 22a and the fixed terminal 22c to the playback amplifier 23. The level of the output signal of the playback amplifier 23 is detected and, if it is not sufficient, results in actuating the alarm 25. Although the duration of each of the pulses in the signals $S_2$ and $S_3$ in FIG. 2 indicates that the recording, and therefore, the playback takes on 1/60 of a second and thus allows the presentation of only one field rather than the interlaced two fields that make up a complete frame, the duration of each of the pulses in the signals $S_2$ and $S_3$ may be made twice as great so as to permit recording and then playback of a complete frame at the selected, spaced intervals. The spacing may be one frame per second or any other desired figure.

Arrangements may be made to speed up the movement of the tape 1 at any time it is desired to record a greater percentage of the available video image signals. For example, in the case of apparatus being used to monitor a bank, actuation of a silent alarm may be used to cause the video apparatus to record each successive field. This would require changing the count of the counter 17, and if each field were being recorded, it would require deactivation of the switching means 22, since there would be no time available to monitor the recorded signals.

Alternatively, the tape 1 might be moved at the usual video tape recording speed but with only occasional fields or frames being recorded. In that case the monitoring transducer of the pair of transducers 2, or a monitoring pair of transducers, would preferably be offset to trace out the same track areas on which signals had been recorded in order to monitor the operation by the apparatus in the manner contemplated in this invention. One advantage of moving the tape 1 rapidly at all times would be that it would be easy to record each field without having to speed up the movement of the tape. However, an alternative slowing down of the tape 1 during quiet times might be desirable rather than to have most of the tape pass through the apparatus without having any recording made on it. In that case the motor 9 could be operated intermittently and should be timed to bring the tape 1 up to proper operating speed just before the beginning of each interval $S_2$ and keep it at that speed until just after each interval $S_3$.

It will be understood that various modifications could be made in the apparatus without departing from the true scope of the present invention as defined by the following claims.

What is claimed is:

1. A time lapse video tape recorder comprising:
   A. magnetic transducer means moving at a predetermined speed;
   B. means for selecting certain video image signals of a succession of said signals and for recording only said certain signals on said medium during intermittent recording intervals;
   C. means for moving a recording medium past said transducer means at an average rate of speed too low to record all of said video image signals on said medium; and
   D. means to monitor the recorded signals during intervals succeeding the intermittent recording intervals.

2. The time lapse video tape recorder of claim 1 in which said means to monitor the recorded signals comprises detector means and means responsive to a difference between the detected signals from said detector means and a predetermined signal.

3. The time lapse video tape recorder of claim 1 in which said means for moving said recording medium moves said medium continuously.

4. The time lapse video tape recorder of claim 3 in which said means for moving said medium moves said medium at a speed that is the same fraction of the speed that would be required to record all of said video image signals as the ratio of said certain video image signals to all of said video image signals.

5. The time lapse video tape recorder of claim 1 in which said means for selecting certain video image signals comprises:
   A. a counter to count a selected number of vertical synchronizing signals of said video image signals, said counter producing a timing signal each time said selected number is counted;
   B. first gate signal generating means connected to said counter to initiate a first gate signal in response to each said timing signal;
   C. means connecting at least selected ones of said vertical synchronizing signals to said generating means to terminate each said first gate signal; and
   D. second gate signal generating means connected to said first gate signal generating means to produce a second gate signal following each said first gate signal, said second gate signal generating means being connected to control said means to monitor said recorded signal.

6. The time lapse video tape recorder of claim 5 comprising, switching means connected to said transducer means, to said means for selecting certain video image signals, and to said means to monitor said recorded signal, whereby said switching means transmits said certain video signals to said transducer means to be recorded during each said first gate signal and transmits signals from said transducer means to said means to monitor said recorded signal during each said second gate signal.

7. The time lapse video tape recorder of claim 5 in which said first and second gate signal generating means are connected to a source of said vertical synchronizing signals to terminate the respective gate signals in response to the next vertical synchronizing pulse following the initiation of the respective gate signals.

* * * * *